United States Patent
Abdala et al.

(10) Patent No.: US 9,810,887 B1
(45) Date of Patent: *Nov. 7, 2017

(54) OVERHANG ENCLOSURE OF A PANORAMIC OPTICAL DEVICE TO ELIMINATE DOUBLE REFLECTION

(71) Applicant: HOYOS VSN CORP., San Juan, PR (US)

(72) Inventors: Julio Abdala, Southwest Ranches, FL (US); Patricio Durazo, Tucson, AZ (US); Gary Peterson, Center City, MN (US); Claudio Ribeiro, Evanston, IL (US); William H. Robertson, Jr., Fort Lauderdale, FL (US)

(73) Assignee: HOYOS INTEGRITY CORPORATION, San Juan, PR (US)

( * ) Notice: Subject to any disclaimer, the term of this patent is extended or adjusted under 35 U.S.C. 154(b) by 276 days.

This patent is subject to a terminal disclaimer.

(21) Appl. No.: 14/478,361

(22) Filed: Sep. 5, 2014

(51) Int. Cl.
| | |
|---|---|
| G02B 13/06 | (2006.01) |
| G03B 37/06 | (2006.01) |
| G02B 19/00 | (2006.01) |
| G02B 17/08 | (2006.01) |
| G02B 5/00 | (2006.01) |
| H04N 5/232 | (2006.01) |
| F21V 7/04 | (2006.01) |

(52) U.S. Cl.
CPC ............ *G02B 13/06* (2013.01); *F21V 7/041* (2013.01); *G02B 5/003* (2013.01); *G02B 17/08* (2013.01); *G02B 19/008* (2013.01); *G03B 37/06* (2013.01); *H04N 5/23238* (2013.01)

(58) Field of Classification Search
CPC ...... G02B 13/06; G02B 19/008; G02B 17/08; G02B 17/0808; G02B 17/0689; G03B 37/06
USPC ............................................. 348/36; 359/725
See application file for complete search history.

(56) References Cited

U.S. PATENT DOCUMENTS

| | | | | |
|---|---|---|---|---|
| 4,395,093 A | * | 7/1983 | Rosendahl ............ | G02B 13/06 359/725 |
| 4,566,763 A | * | 1/1986 | Greguss ................ | G02B 13/06 359/725 |
| 5,627,675 A | * | 5/1997 | Davis .................... | G02B 13/06 359/366 |
| 5,854,713 A | * | 12/1998 | Kuroda ................. | G02B 13/06 250/234 |

(Continued)

*Primary Examiner* — John Villecco
(74) *Attorney, Agent, or Firm* — Patents on Demand P.A.; Brian K. Buchheit

(57) ABSTRACT

A quadric reflector can have an approximately conical shape. The shape can tapers from a wide base to an apex. The apex can include an aperture, a mirror, and a set of one or more optical elements. A mirror can be positioned within an overhang enclosure of the device in a plane approximately parallel to a circular cross section of the conical shape. The mirror can reflect environmental light that is reflected by the quadric reflector into the aperture or reflect light emitting from the aperture onto the quadric reflector. The overhang enclosure can have a substantially conical shape which eliminates secondary reflection resulting from the environmental light reaching the aperture twice. Using the overhang enclosure to absorb the secondary reflection eliminates or minimizes banding.

19 Claims, 9 Drawing Sheets

(56) References Cited

U.S. PATENT DOCUMENTS

| | | | | |
|---|---|---|---|---|
| 6,028,719 A * | 2/2000 | Beckstead | ......... | A61B 1/00177 359/618 |
| 6,130,783 A * | 10/2000 | Yagi | ..................... | H04N 5/2259 348/E5.03 |
| 6,222,683 B1 * | 4/2001 | Hoogland | ............. | G02B 13/06 348/36 |
| 6,333,826 B1 * | 12/2001 | Charles | ................. | G02B 13/06 359/725 |
| 6,449,103 B1 * | 9/2002 | Charles | ................. | G02B 13/06 359/366 |
| 6,704,148 B2 * | 3/2004 | Kumata | ................. | G02B 13/06 348/E5.028 |
| 6,789,908 B2 * | 9/2004 | Garcia | ............... | G02B 17/0615 359/728 |
| 7,154,551 B2 * | 12/2006 | Kuriyama | ........... | H04N 5/2254 348/335 |
| 7,570,437 B2 * | 8/2009 | Gal | ........................ | G02B 13/06 359/648 |
| 8,451,318 B2 * | 5/2013 | Trubko | ................. | G02B 13/06 348/335 |
| 8,471,892 B2 * | 6/2013 | Geng | ............. | G08B 13/19628 348/36 |
| 9,151,933 B2 * | 10/2015 | Sato | ....................... | G02B 13/06 |
| 9,395,526 B1 * | 7/2016 | Abdala | ................. | G02B 17/08 |
| 2002/0154417 A1 * | 10/2002 | Wallerstein | ............ | G02B 13/06 359/725 |
| 2004/0252384 A1 * | 12/2004 | Wallerstein | ............ | G02B 13/06 359/725 |
| 2004/0264013 A1 * | 12/2004 | Matsuki | ................ | G02B 13/06 359/871 |

* cited by examiner

Cylindrical Overhang 111

Panoramic Optical Device
110

Wide Conical Overhang 112

Panoramic Optical Device
114

Curved spacer 117

Panoramic Optical Device
116

Non-uniform spacer 119

Panoramic Optical Device
118

Optimum Light Path 130

Light Blocked 132 (e.g., overhang too large)

Secondary Reflection Blocked 134 (e.g., optimum overhang)

Secondary Allowed 136 (e.g., overhang too small)

Secondary Blocked 140 (e.g., optimum overhang)

Secondary Reflection Allowed 142 (e.g., overhang too small)

Removable Top 160

Removable Top 162
(Overhang Shape A)

Removable Top 164
(Overhang Shape B)

OVERHANG ENCLOSURE OF A PANORAMIC OPTICAL DEVICE TO ELIMINATE DOUBLE REFLECTION

BACKGROUND

The present invention relates to the field of panoramic optical device and, more particularly, to improving an overhang enclosure of a panoramic optical device to eliminate double reflection.

Providing high quality optics in a panoramic camera is challenging. Different approaches have been taken for this problem. One approach is to move a lens and to capture a set of images as the lens moves, which cover a field of view over time. The images from the moved lens are combined to form panoramic scene. Another approach is to form an array of multiple different camera lenses and to combine the image results captured by the array of lenses into a single image. Still another is to utilize an ultra-wide angle lens (e.g., a fish-eye lens) to capture a scene with a wider-than-normal field of view. Yet another is to use a panoramic optical device to create a 360 degree horizontal field of view using a single shot (a discrete point of time using a single lens). This later approach is sometimes referred to as a "one-shot" panoramic device, which captures a panoramic scene in a single point in time using a single lens. Each of these approaches has benefits and drawbacks depending on use cases.

Within one-shot solutions that use panoramic optical components, a number of approaches have been taken depending on situation. Frequently, these components permit a single 360 degree image of an environment to be captured. Images captured by this technique are often distorted, but can be software corrected using digital signal processing (DSP) techniques. However, software correction distortion correction can be limited. Further, distortion caused from too much light reaching an image sensor cannot be easily corrected through software correction.

BRIEF SUMMARY

One aspect of the present invention describes panoramic optical device having a quadric reflector, a mirror, an overhang enclosure, and a set of one or more optical elements. The quadric reflector has an approximately conical shape, which tapers from a wide base to an apex, said apex comprising an aperture. The mirror is positioned within the overhang enclosure of the device in a plane approximately parallel to a circular cross section of the conical shape. The mirror reflects environmental light that is reflected by the quadric reflector into the aperture or reflecting light emitting from the aperture onto the quadric reflector. The overhang enclosure has a substantially conical shape, which tapers from a wide base at a topmost portion to a narrower center. The mirror is positioned a narrower center of the overhang enclosure or within a concavity of the narrower center. Circular cross sections of the overhang's substantially conical shape from the topmost portion to the narrower center portion have an approximately diminishing circular cross section. A taper of the overhang is inverse to a taper of the quadric reflector. An outer tapering surface of the overhang enclosure between at least the topmost portion and the narrower center portion is formed from or coated with a light absorbing material. The substantially conical shape of the overhang enclosure permits environmental light to reflect off the quadric reflector without operational blockage while the substantially conical shape absorbs secondary reflections to prevent them from entering the aperture. The set of one or more optical elements are positioned at least partially within a volumetric region of the quadric reflector. The optical elements focus light passing through the aperture.

One aspect of the present invention describes a one-shot panoramic camera optical component including a mirror, an overhang enclosure, and a transparent outer casing. The mirror is positioned within the overhang enclosure of the device in a plane approximately parallel to a circular cross section of a quadric reflector. The mirror reflects environmental light that is reflected by the quadric reflector into an aperture of the quadric reflector. The overhang enclosure has an outer surface that comprises a light absorbing material which absorbs stray light. Stray light is light reflected from an interior of a transparent outer casing. The outer surface absorbs a significant portion of light reflecting off an interior of the transparent outer casing. The transparent outer casing has a circular cross section. A topmost portion of the overhang enclosure is secured to a topmost portion of the transparent outer casing. A bottommost portion of the transparent outer casing is securable to a structure that supports the quadric reflector. An interior volume of the transparent outer casing when secured to the structure includes the quadric reflector, the mirror, and the overhang enclosure. The substantially conical shape of the overhang enclosure permits environmental light to reflect off the quadric reflector without operational blockage while the substantially conical shape absorbs reflections off an interior of the transparent outer casing to prevent secondary reflections from entering the aperture.

One aspect of the present invention describes a device having a base and a screwable top. The base comprising of a housing that includes a quadric reflector and a set of one or more optical elements. The quadric reflector has an approximately conical shape, which tapers from a wide base to an apex. The apex includes an aperture. The set of one or more optical elements are positioned at least partially within a volumetric region of the quadric reflector. The optical elements focusing light passing through the aperture. The screwable top includes a mirror, and overhang enclosure, and a transparent outer casing. The mirror is positioned within an overhang enclosure of the device in a plane approximately parallel to a circular cross section of a quadric reflector when the screwable top is secured to the base. The mirror reflects environmental light that is reflected by the quadric reflector into an aperture of the quadric reflector. The overhang enclosure has an outer surface that comprises a light absorbing material which absorbs stray light. Stray light is light reflected from an interior of a transparent outer casing. The outer surface absorbs a significant portion of light reflecting off an interior of the transparent outer casing. The transparent outer casing has a circular cross section. An interior volume of the transparent outer casing when secured to the base includes the quadric reflector, the mirror, and the overhang enclosure. The substantially conical shape of the overhang enclosure permits environmental light to reflect off the quadric reflector without operational blockage while the substantially conical shape absorbs reflections off an interior of the transparent outer casing to prevent secondary reflections from entering the aperture.

DETAILED DESCRIPTION

Figure 1A:
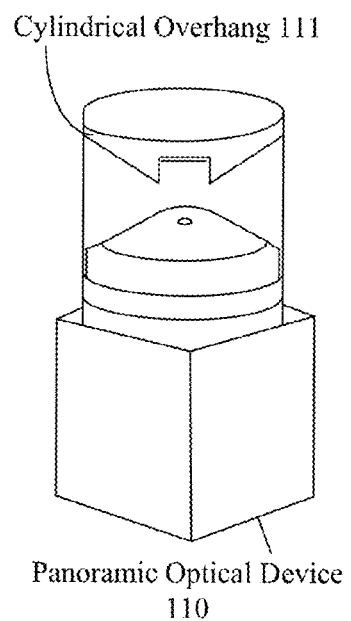
FIG. 1A is a schematic diagram illustrating a set of embodiments for a panoramic optical device with an enclosure overhang in accordance with an embodiment of the inventive arrangements disclosed herein.
Figure 1A:
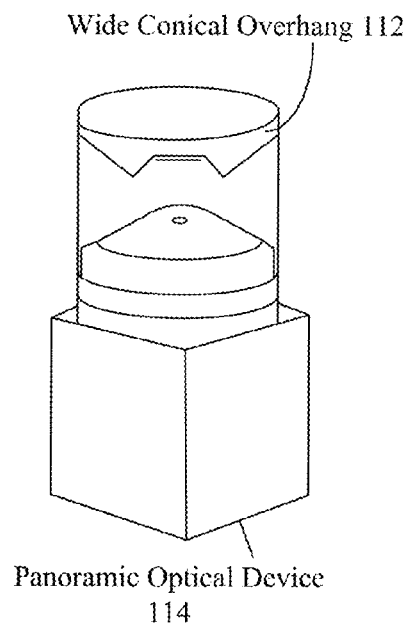
Figure 1A:
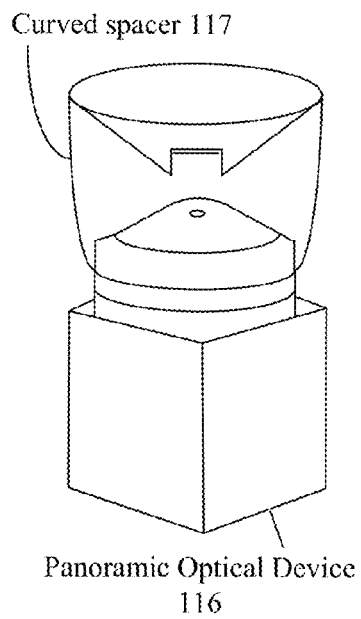
Figure 1A:
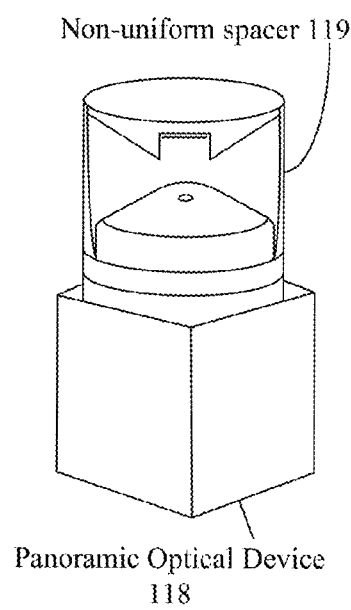

The present disclosure is a solution for improving an overhang enclosure of a panoramic optical device to eliminate double reflection issues. The panoramic device can be a one-shot image capture device able to capture images or video in a three hundred and sixty degree horizontal field of view. The device uses a quadric reflector (e.g., a parabolic, hyperbolic, or elliptical reflecting surface) having an aperture within its apex. A mirror is supported by the overhang enclosure to reflect light from the quadric surface through the aperture. An image sensor is positioned on an opposite side of the aperture from the mirror receives, where the image sensor processes the reflected light.

The overhang enclosure can be positioned above the quadric reflector to eliminate environmental light which can otherwise cause image banding. The overhang can be approximately conically shaped and positioned with an inverse taper to that of the quadric reflector. That is, the overhang can have an effectively diminishing circular cross section from a topmost portion to a bottommost portion when mounted. The mirror can be positioned at the bottommost portion of the overhang enclosure or can be positioned within a concavity (a recess) built into the overhang enclosure. The concavity, in embodiments where one is used, is built into the bottommost portion of the overhang enclosure having a smallest circular cross section relative to the topmost portion. The outer surface of the overhang can be a light absorbing one. Environmental light that directly strikes the overhang through a transparent outer casing (e.g., clear acrylic shell in one embodiment that supports the overhang enclosure) can be absorbed. Environmental light that reflects off the interior of a transparent outer casing is also absorbed by the overhang enclosure. The angle and tapering of the overhang ensure that "desired" light that is intended to reflect off the quadric reflector onto the mounted mirror and through the aperture is unblocked. The overhang enclosure shape, however, is formed to block stray reflections from the interior of the panoramic optical device to ensure secondary (tertiary, fourth order, etc.) reflections are not conveyed through the aperture to the image sensor. It has been determined by the inventors that these secondary reflections, which are minimized/eliminated using the light absorbing overhang enclosure, are responsible for image banding otherwise present in one-shot panoramic cameras.

In one embodiment, the transparent outer casing can be curved or otherwise formed to work cooperatively with overhang enclosure to ensure that secondary reflections (off the interior of the transparent outer casing) are directed to the light absorbing overhang enclosure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be appreciated that the disclosure addresses a novel limitation associated with panoramic optical cameras. The limitation can include image banding which can occur when an environment includes objects such as mirrors and windows which can reflect additional light to optical components. In these instances, software correction cannot be utilized (or is inefficient/non-optimal) and a new approach as detailed herein significantly improves image capture. The new approach is embodied within the overhang enclosure (e.g., and related components) of the panoramic optical device disclosed herein. The overhang absorbs second, third, and higher order reflections off an interior of the panoramic optical camera without impeding first order reflections that reflect from a quadric reflector to a mirror and through an aperture of the quadric reflector, where these first order reflections are directed to an image sensor for processing.

FIG. 1A is a schematic diagram illustrating a set of embodiments 110, 114, 116, 118 for a panoramic optical device with an enclosure overhang in accordance with an embodiment of the inventive arrangements disclosed herein. Embodiments 110, 114, 116, 118 can illustrate a set of configurations for an overhang and a transparent spacer (also referred to as a transparent outer casing) for an optical panoramic device. The transparent spacer can be shaped to direct (e.g., refract) environmental light towards enclosure overhang surfaces and/or quadric reflector. The light directed towards the overhang surface includes secondary reflections, which reflect from an interior of the transparent spacer. Thus, the shape of the transparent spacer and the overhang cooperatively work to eliminate secondary reflections while ensuring primary reflections (e.g., environmental light traveling through the transparent spacer, to the quadric reflector, off the top mounted mirror, through the aperture, to an image sensor contained within a volume of the quadric reflector) are not blocked.

Panoramic optical device 110 can include a conical overhang 111 with a mirror recessed within the overhang (also referred to as an overhang enclosure). For example, overhang 111 can include a cylindrical cavity with an open end (e.g., for reflected light) and a closed end (e.g., surface mated to mirror).

Panoramic optical device 114 can include a wide conical overhang 112 with a mirror recessed within the overhang. For example, overhang can include a conical shape of an opening angle of greater than 90 degrees.

Panoramic optical device 116 can include a curved spacer 117 which can enable environmental light to be refracted into the overhang of device 116. In one instance, the spacer 117 can conform to a partially convex surface permitting environmental light (e.g., below 0 degrees) to be directed to an overhang enclosure of the device 116.

Panoramic optical device 118 can include a non-uniform spacer 119 which can enable environmental light to be refracted into the overhang of device 118. In one instance, the spacer 119 can include a uniform exterior wall and a non-uniform interior wall. For example, spacer 119 can include a partially convex interior wall which can permit environmental light (e.g., below 0 degrees) to be directed to an overhang enclosure of the device 118.

As used herein, the conical shape of the overhang 111, 112 refers to a shape with a circular cross section, which generally decreases from a topmost to a bottom most portion of the overhang. The tapering of the overhang is an inverse of a tapering of the quadric surface. The conical shape of the overhang can include numerous circular ridges in one embodiment. In other embodiments, the conical shape can be a quadric shape having a curve to it. The general shape of the overhang permits environmental light to travel unimpeded (without being blocked by the overhang to the quadric reflector) while absorbing second order reflections off an interior of the transparent surface supporting the overhang.

Figure 1B:
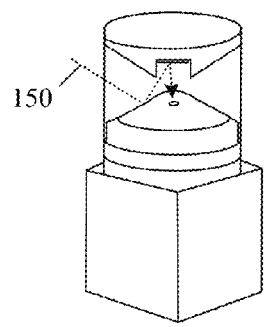
FIG. 1B is a schematic diagram illustrating a panoramic optical device with an enclosure overhang in accordance with an embodiment of the inventive arrangements disclosed herein.
Figure 1B:
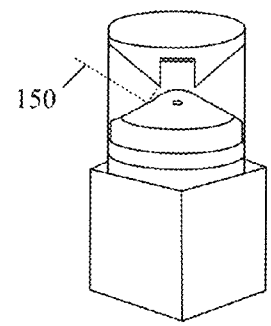
Figure 1B:
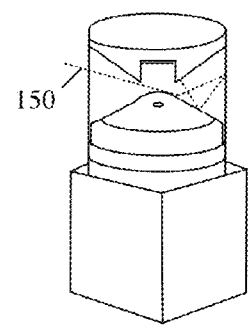
Figure 1B:
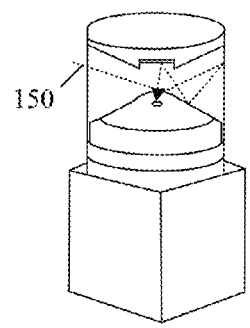
Figure 1B:
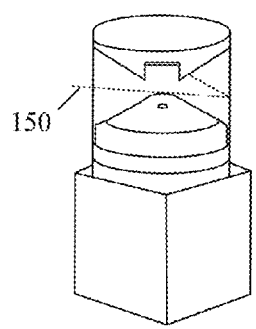
Figure 1B:
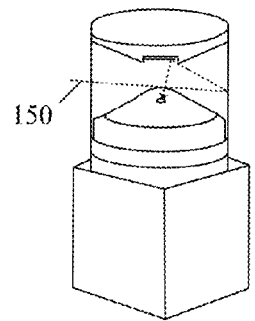

FIG. 1B is a schematic diagram illustrating a set of embodiments 130-142 for a panoramic optical device with an enclosure overhang in accordance with an embodiment of the inventive arrangements disclosed herein. Embodiments 130-142 illustrate various environmental light conditions and overhang enclosure arrangements ranging from large enclosure configurations to small enclosure configurations. It should be appreciated that there can include a range of optimum configurations in which overhang enclosure can be embodied. Optimum configurations presented herein are for illustrative purposes only and should not be construed to limit the invention in any regard.

In optimum light path 130 embodiment, an overhang enclosure can reflect light 150 into aperture of the optical panoramic device. The overhang enclosure can be optimally configured to enable environmental light striking the spacer (e.g., 35 degrees) to be reflected into the aperture.

In contrast, in light blocked 132 embodiment, overhang enclosure can block light 150, resulting in light 150 being absorbed by the enclosure. That is, light 150 does not reach the aperture of the panoramic optical device.

In secondary reflection blocked 134 embodiment, an optimum overhang can ensure environmental light 150 is reflected into the aperture of the panoramic optical device while eliminating secondary reflections of light 150 from entering into the aperture.

In contrast, in secondary allowed 136 embodiment, an overhang can permit secondary reflection of light 150 to enter the aperture of the panoramic optical device.

In secondary blocked 140 embodiment, an optimum overhang can enable secondary reflection of light 150 to be blocked. For example, light 150 striking the spacer (e.g., between 0-15 degrees) can be reflected by the internal wall of spacer and can be absorbed by the overhang enclosure.

In contrast, in secondary reflection allowed 142, an overhang can permit secondary reflection of light 150 to be transmitted to the aperture of the panoramic optical device. That is, when overhang is too small, the light 150 can cause image banding associated with secondary reflection of environmental light.

Figure 1C:
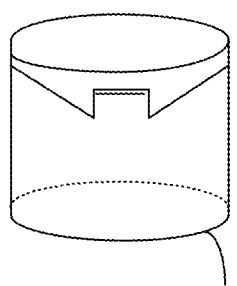
FIG. 1C is a schematic diagram illustrating different shaped enclosure overhangs within a removable top in accordance with embodiments of the inventive arrangements disclosed herein.
Figure 1C:
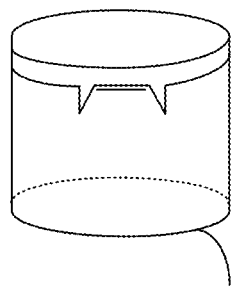
Figure 1C:
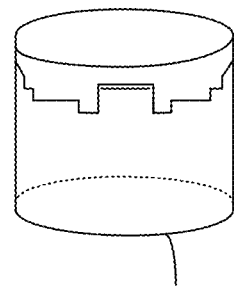

FIG. 1C is a schematic diagram illustrating different shaped enclosure overhangs within a removable top in accordance with embodiments of the inventive arrangements disclosed herein.

The removable top 160 is similarly shaped to the overhang 111. The top is able to be security coupled/decoupled from a base. The coupling/decoupling can be through friction, a screw coupling, and the like.

An alternative overhang shape is shown by removable top 162. There, the cavity walls within which a mirror is inset are outwardly angled similar to wide conical overhang 112, but the outside shape has approximately a ninety degree angle (instead of being a cone).

Yet another alternative overhang shape is shown by removable top 164. In this top, the topmost mirror is recessed in a cylinder and the overhang shape is irregular.

Appreciably, all of the embodiments 160, 162, 164 have very different overhang shapes, each of which is capable of absorbing stray light reflections. As defined here, stray light reflections refer to reflections from the quadric reflector and/or top mounted mirror that strike the transparent sides of the spacer supporting the overhang and reflect inwardly as a result. An optimal shape of the overhang for absorbing stray reflections depends on optical properties/shapes of the quadric reflector, of the top mounted mirror, the transparent side wall, as well as relative distances between these components. Deviations of shape are therefore contemplated and to be considered within scope of the disclosure so long as the stray reflections is able to be absorbed by the chosen overhang shape given the optical properties of other components of the system.

Figure 2A:
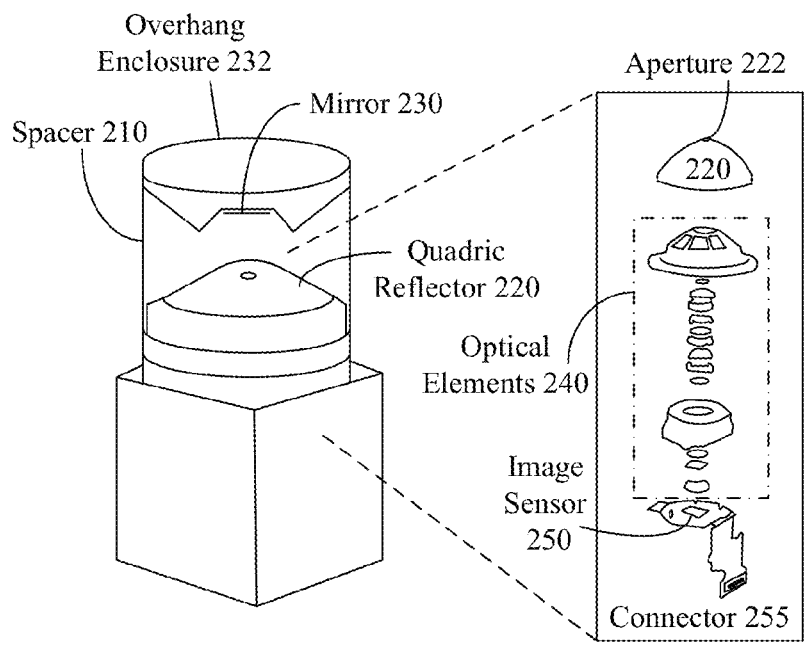
FIG. 2A is a schematic diagram illustrating a panoramic optical device with an enclosure overhang in accordance with an embodiment of the inventive arrangements disclosed herein.

Referring to FIG. 2A, a panoramic optical device is shown and described in accordance with embodiments of the disclosure. The device includes an overhang enclosure 232, a quadric reflector 220, a reflecting mirror 230, and a spacer 210, though which light passes. The quadric reflector 220 includes a hole or aperture 222 in its apex.

In one embodiment, a set of components included in a base of the panoramic optical device includes optical elements 240 and an image sensor 250 electrically coupled to connector 255. The optical elements 240 guide light reflected off mirror 220 to strike sensor 250. The optical elements may also filter undesired optical wavelengths, correct for color aberrations that would otherwise cause different colors to focus at different planes and positions, and/or ensure despite distortions from the quadric reflector 220 that the optical image substantially lays on a flat focal plane.

In another embodiment, the set of components can include a light emitter, such as a pico-projector chipset or a set of light emitting diodes (LEDs) of varying colors, which permits the panoramic optical device to become a light/image projector instead of an image capture device.

The overhang enclosure 232 can be utilized to restrict and/or eliminate secondary reflections from environmental light entering the aperture 222. In one instance, enclosure 232 material can include polymethyl methacrylate (PMMA, or acrylic), thermoplastic polymers, and the like.

The quadric reflector 220 is a reflective conical surface, which may be a parabolic surface, a hyperbolic surface, a hemispherical surface, or an elliptic surface. More specifically, the quadric reflector 220 as used herein is a non-degenerate real quadratic surface that tapers from a wide base towards an apex, where the aperture 222 is positioned.

The image sensor 250 is a component that converts an optical image into an electronic signal. Any of a variety of image sensors technologies can be for the image sensor 250 including, but not limited to, semiconductor charge-coupled devices (CCD), active pixel sensors in complementary metal-oxide-semiconductor (CMOS), and N-type metal-oxide-semiconductor (NMOS, Live MOS) technologies.

In embodiments, where the image sensor 250 is replaced with a pico-projector, also referred to as a pocket projector, a mobile projector, a handheld projector or a mini beamer) any of a number of technologies can be utilized including, but not limited to digital light processing (DLP), MICROVISION's beam-steering, and LCoS (Liquid crystal on silicon) based technologies.

In one embodiment, positive elements of the optical elements 240 can be made from polymethyl methacrylate (PMMA, or acrylic), other transparent thermoplastic, glass, or other suitable substances. Negative ones of the optical elements 240 can be made of polycarbonate, other thermoplastic polymers, or other suitable substances.

Figure 2B:
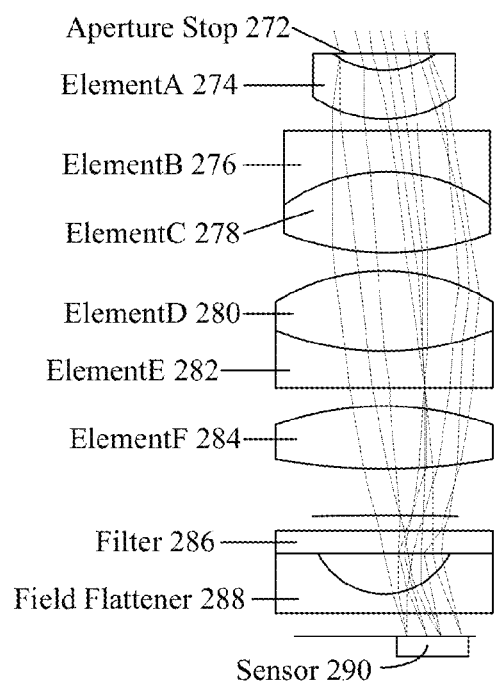
FIG. 2B is a schematic diagram illustrating a set of optical elements for a panoramic optical device in accordance with an embodiment of the inventive arrangements disclosed herein.

FIG. 2B shows optic elements between the aperture stop 272 and the image sensor 290 in accordance with embodiments of the disclosure. In FIG. 2B, the aperture stop 272 limits the bundle of light that passes through the optical elements. ElementA 274 captures light passing through the aperture stop and reduces its divergence. In one embodiment, cemented doublets can be formed from ElementB 276 and ElementC 278. ElementD 280 and ElementE 282 produce a converging beam and correct color aberrations that would otherwise cause different colors to be focused at different planes and positions. ElementF 284 increases convergence of the light. A flat filter 286 can be used to block infrared, violet, and ultraviolet radiation. The filtered wavelengths can blur the image and produce color rendering errors in some embodiments. The field flattener 288 corrects extreme field curvature in the virtual image within the quardric reflector 220. The field flattener 288 results in the image sent to the sensor 290 lying flat on a focal plane. Not all elements 272-288 are needed in all embodiments and further elements (not shown) may be included in different contemplated embodiment of the disclosure.

Figure 3:
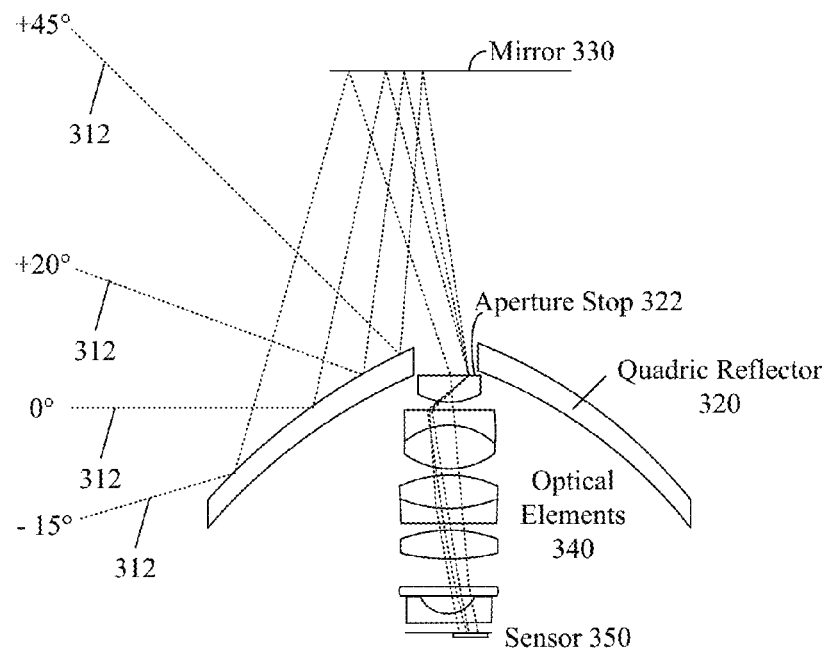
FIG. 3 is a schematic diagram illustrating a ray trace diagram of light reflecting off a quadric reflector at different angles in accordance with embodiments of the disclosure in accordance with an embodiment of the inventive arrangements disclosed herein.

FIG. 3 shows a ray trace diagram of light 312 reflecting off the quadric reflector 320 at different angles in accordance with embodiments of the disclosure. The reflected light strikes mirror 330 and is directed towards the aperture stop 322. From here, the light is guided by optical elements 340 so that it strikes sensor 350.

The angles shown are from the horizon. It should be appreciated that most one-shot cameras are unable to handle angles below the horizon, such as the negative fifteen degree angle. The positioning of the parabolic reflector 320 relative to the mirror 330 and the aperture stop 322 results in a substantially greater vertical field of view at high fidelity than is possible using conventional technologies.

The reflections off the mirror 330 result in different angles of light striking the aperture stop 322. The optic elements 340 focus and filter this light to strike the sensor 350. From a design perspective, the sensitive of the sensor 350 is paired to the optic elements 340, to maximum the fidelity of images (able to be read by the sensor 350), while minimizing costs of the optical elements 340, which have a significant expense due to necessary precision and tolerances. In this manner, a 4K image sensor (350) is able to be utilized with the panoramic optical device to produce high definition video (HDV) at 1080 lines or greater.

Unlike conventional one-shot devices, optical elements 340 and sensor 350 are protected within the curvature of the quadric reflector 320. This results in a compact form factor, where sensitive components are easier to protect than alternative technologies.

Figure 4:
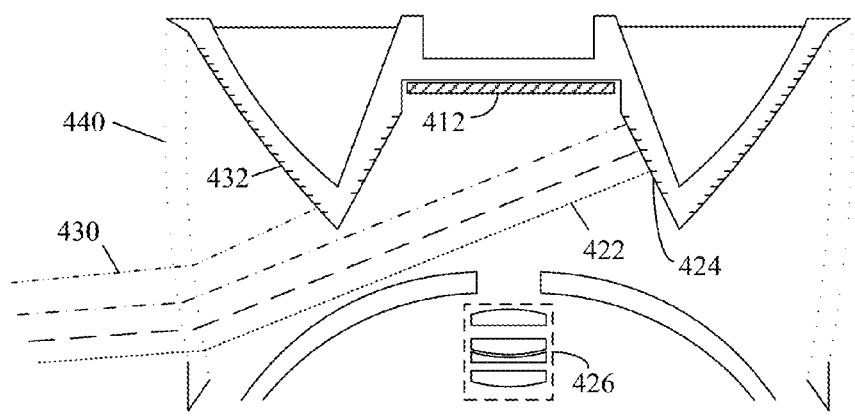
FIG. 4 shows a ray trace diagram of environmental light at different angles blocked by overhand enclosure in accordance with embodiments of the disclosure

FIG. 4 shows a ray trace diagram of environmental light 430, 422 at different angles blocked by overhand enclosure 432, 424 in accordance with embodiments of the disclosure.

Environmental light 430 can pass through transparent spacer 440 and can be absorbed by overhang enclosure portion 432. That is, environmental light 430 can be refracted by spacer 440 resulting in the light path travelling approximately tangential to the quadric reflector and striking enclosure portion 432. In one instance, overhang enclosure portion 432 can include one or more grooves which can absorb environmental light 430. In the instance, the groove characteristics can be optimized for maximum light absorption based on light spectrum, light angle of incidence, and the like.

Environmental light 422 can pass through transparent spacer 440 and can be absorbed by overhang enclosure portion 424. That is, light 422 can be refracted by spacer 440 resulting in the light path travelling approximately tangential to the quadric reflector and striking enclosure portion 424. In one instance, overhang enclosure portion 422 can include one or more grooves which can absorb environmental light 422. In the instance, the groove characteristics can be optimized for maximum light absorption based on light spectrum, light angle of incidence, and the like.

Figure 5A:
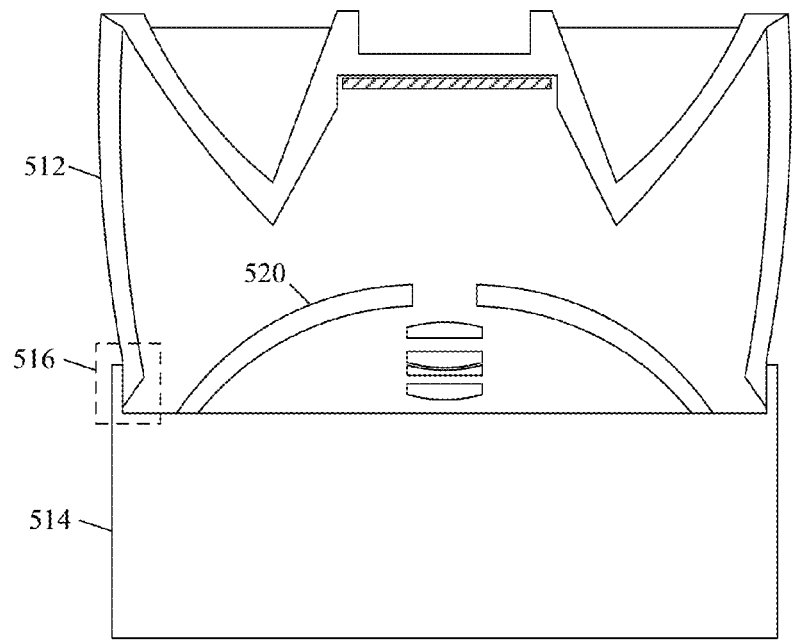
FIG. 5A shows a set of embodiments for attaching an overhang enclosure to a panoramic optical device and an exemplary configuration for an overhang enclosure in accordance with embodiments of the disclosure.
Figure 5A:
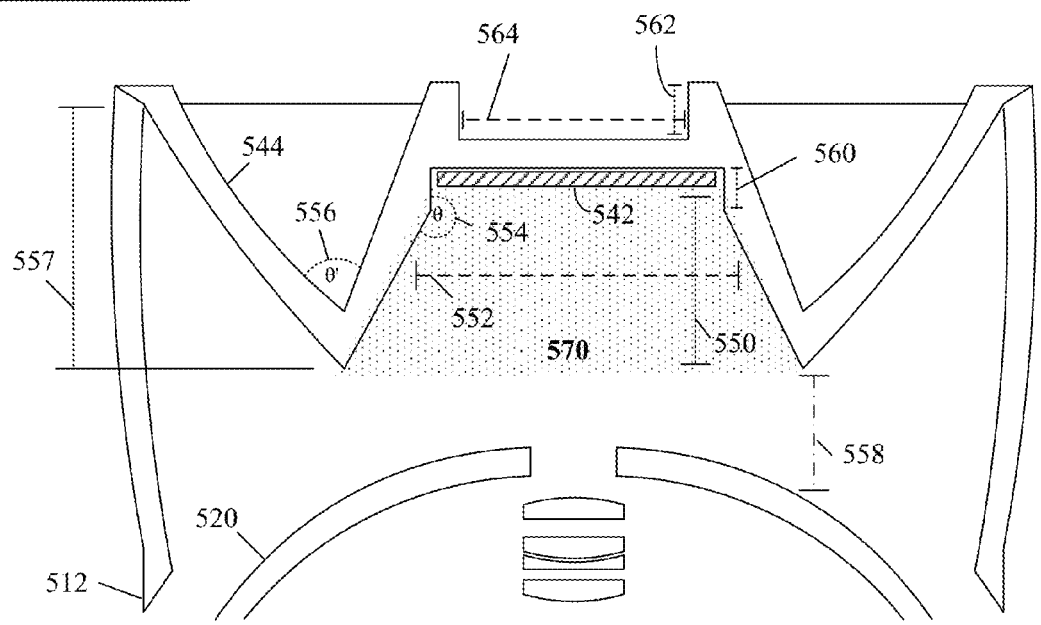

FIG. 5A shows a set of embodiments for attaching an overhang enclosure to a panoramic optical device and an exemplary configuration for an overhang enclosure in accordance with embodiments of the disclosure.

In embodiment 510, an overhang enclosure 512 can be friction fitted to a base of a panoramic optical device. In the embodiment, a bottom portion of a transparent spacer can be securely fitted against a protruding wall of base 514. For example, enclosure 512 can be mated against a lip (e.g., area 516) of base 514. It should be appreciated that enclosure 512 can be fitted to base 514 using one or more traditional and/or proprietary attachment mechanisms. Attachment mechanisms can include, but is not limited to, snapping/locking mechanism, a screw based attachment mechanism, and the like.

In embodiment 540, the overhang enclosure 512 can include a conical cross section (e.g., concavity 570) corresponding to dimensions 522, 550 and an overhang 544 with dimension 557 at an angle 556. In one instance, mirror 542 can be recessed within the concavity 570 based on optimum depth 560. In one configuration of the instance, depth 560 can include a cylindrical portion which can recess the mirror 542 for optimum light reflection into aperture of reflector 520. The concavity 570 can be defined by internal angle 554 which can be utilized to control environmental light absorption. That is, angle 554 can be adjusted to ensure optimum light absorption without affecting light reflected from mirror 542 or reflector 520.

In one instance, overhang 544 can be defined by angle 556 and length 557 which can approximately conform to an inverted conical pyramid. In one embodiment, overhang enclosure 512 can be positioned at a distance 558 from quadric reflector 520 to enable appropriate environmental light absorption.

Overhang enclosure 544 can include a recessed cylindrical area which can be defined by dimension 562, 564. For example, enclosure 544 can include a recessed portion at the top exterior portion of the enclosure.

Drawings presented herein are for illustrative purposes only and should not be construed to limit the invention in any regard. It should be appreciated that overhang enclosure 512 can include additional segments which can be utilized to absorb environmental light to eliminate secondary reflection.

Figure 5B:
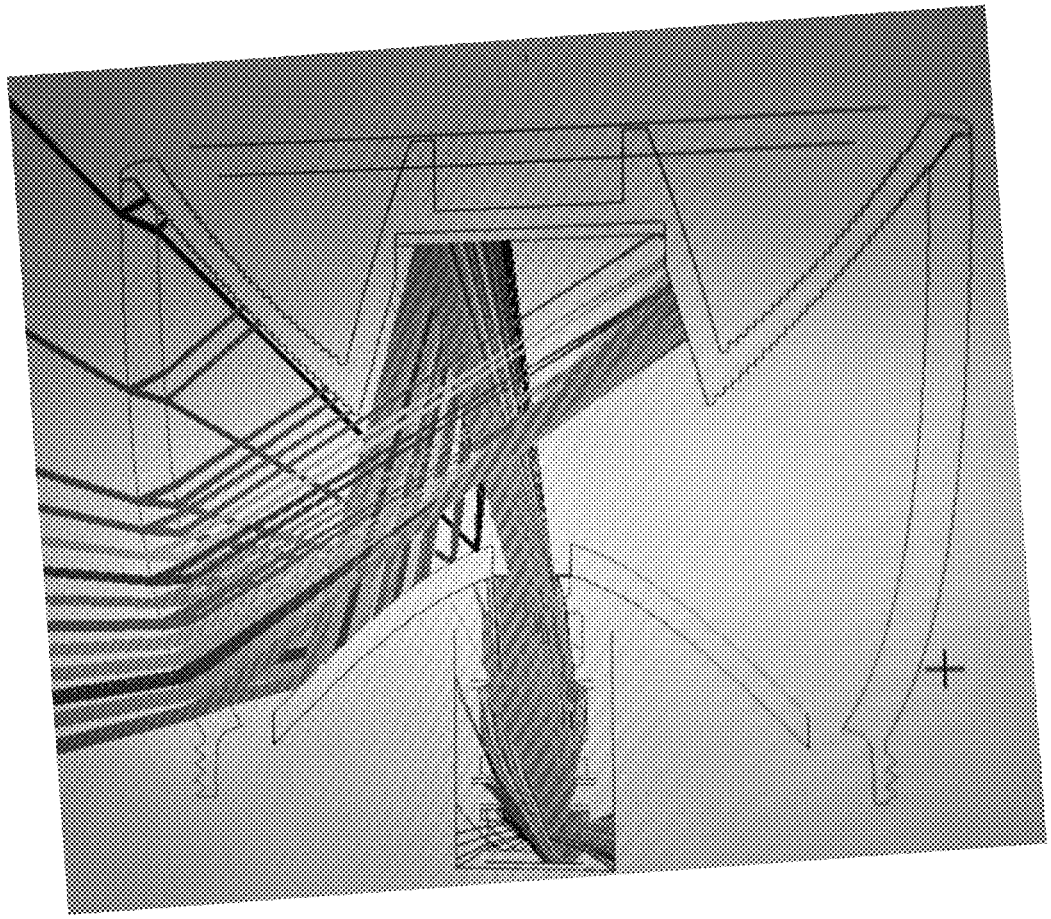
FIG. 5B shows a ray diagram for a panoramic optical device in accordance with embodiments of the disclosure.

FIG. 5B shows a ray diagram for a panoramic optical device in accordance with embodiments of the disclosure. Embodiment 580 illustrates environmental light modeling reflection to establish an optimum overhang enclosure.

In embodiment 580, modeling environmental light to be reflected into the aperture of the optical device while simultaneously eliminating secondary reflections can enable for an optimum overhang enclosure configuration to be determined. For example, light refracted from transparent spacer which travels tangentially across the surface of quadric reflector can be absorbed by an inner wall of an overhang enclosure. It should be appreciated that environmental light which is refracted by transparent spacer onto the mirror in the overhang enclosure can be reflected onto an inner wall of the overhang enclosure. That is, image banding can be eliminated without requiring complex software correction once an optimum enclosure configuration is determined from the light modeling.

Figure 6:
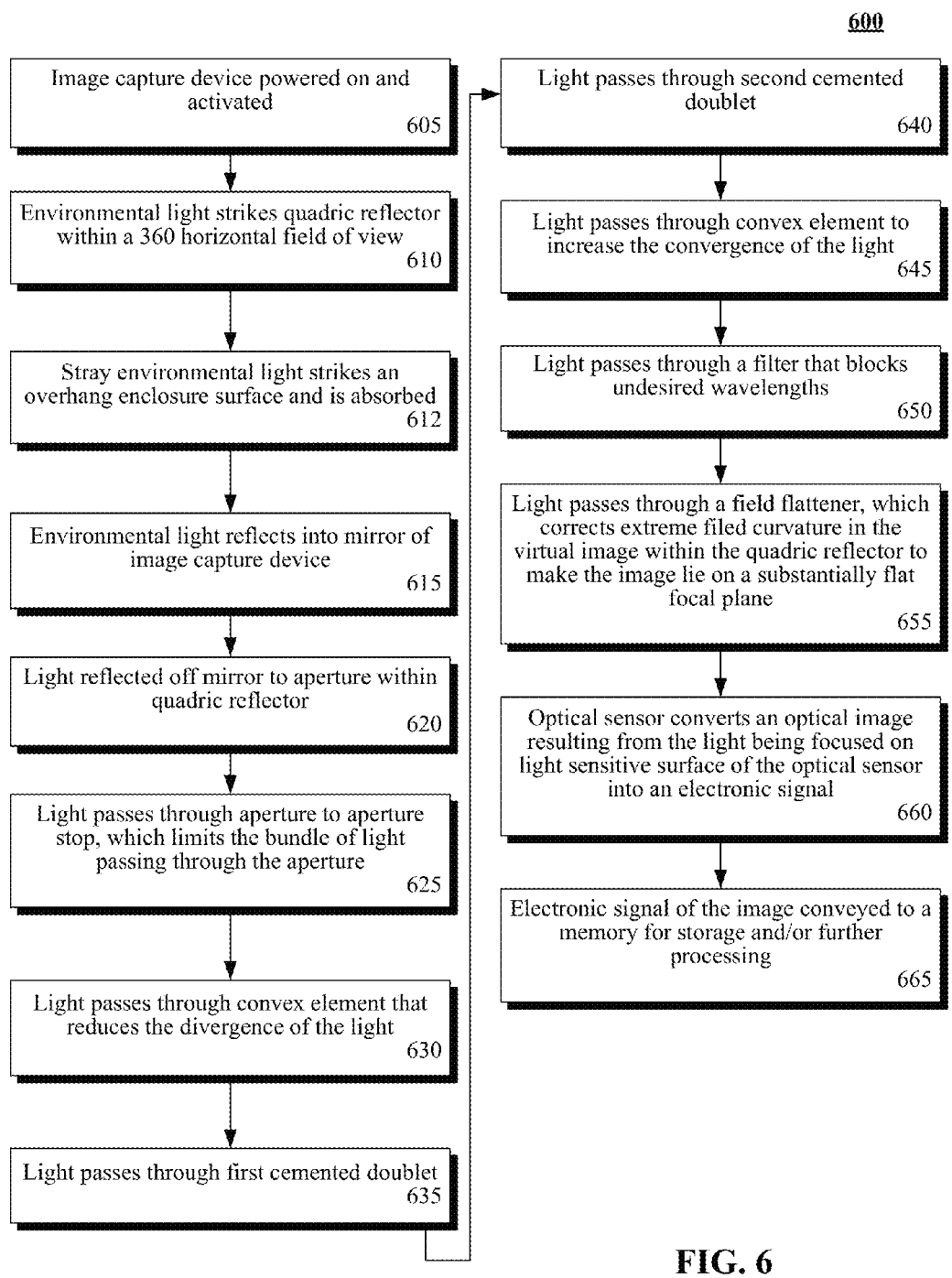
FIG. 6 shows a flow chart for a one shot panoramic camera in accordance with embodiments of the disclosure.

FIG. 6 shows a flow chart for a one shot panoramic camera in accordance with embodiments of the disclosure. The process can begin in step 605, where an image capture device is powered on and activated. In step 610, environmental light strikes a quadric reflector within a 360 horizontal field of view (FOV). Thus, a scene surrounding the optical device is concurrently captured within this 360. The vertical field of view depends on construction, but in one embodiment includes angles between negative fifteen degrees and positive 45 degrees. In step 612, stray environmental light strikes an overhang enclosure surface of the camera and is absorbed. In step 615, environmental light reflects from the quadric reflector to a mirror of the one-shot panoramic camera. The mirror can be positioned directly above the aperture of the quadric reflector in one embodiment. The mirror may be substantially flat (within +/−five percent of being flat). In step 620, light reflected off the mirror can enter an aperture of the quadric reflector.

A set of optical elements can reside on an opposite side of the aperture in embodiments of the disclosure. The described optical elements need not be present in every contemplated configuration of the disclosure and additional elements may be included in contemplated configurations of the disclosure. In step 625, light can pass through the aperture to an aperture stop, which limits the bundles of light passing through. In step 630, light can pass through a convex element that reduces the divergence of the light. In step 635, light can pass through a first cemented doublet to pass through a second cemented doublet in step 640. These doublets can be paired to reduce divergence of the light then to increase convergence (see elements 216, 218, 220, and 222 of FIG. 2, for example). Other embodiments are contemplated, where a single doublet is utilized, or where multiple paired doublets (more than two) are utilized. In step 645, light passes through a filter that blocks undesired wavelengths. For example, infrared, violet, and/or ultraviolet wavelengths may be undesired in that they contribute to blurring the image and producing color rendering errors in some embodiments of the disclosure.

In step 655, light passes through a field flattener, which corrects for extreme curvature in the virtual image due to the conic shape of the quadric reflector. This makes the image lie on a substantially flat (within +/−10 percent of being flat) focal plane. In step 660, an optical sensor converts an optical image resulting from the light being focused on a light sensitive surface of the optical sensor into an electronic signal. In step 665, the electronic signal can be conveyed to a memory for storage and/or further processing. For example, a raw image can be saved to a non-transitory memory in one embodiment, which may be projected from a panoramic projector (see FIG. 7). The raw image may be later processed by a computing device. In another implementation, the electronic signal may be digitally processing, using a variety of digital signal processing techniques and saved post-processing to a non-transitory memory and/or be visually displayed on a screen as a panoramic scene.

Figure 7:
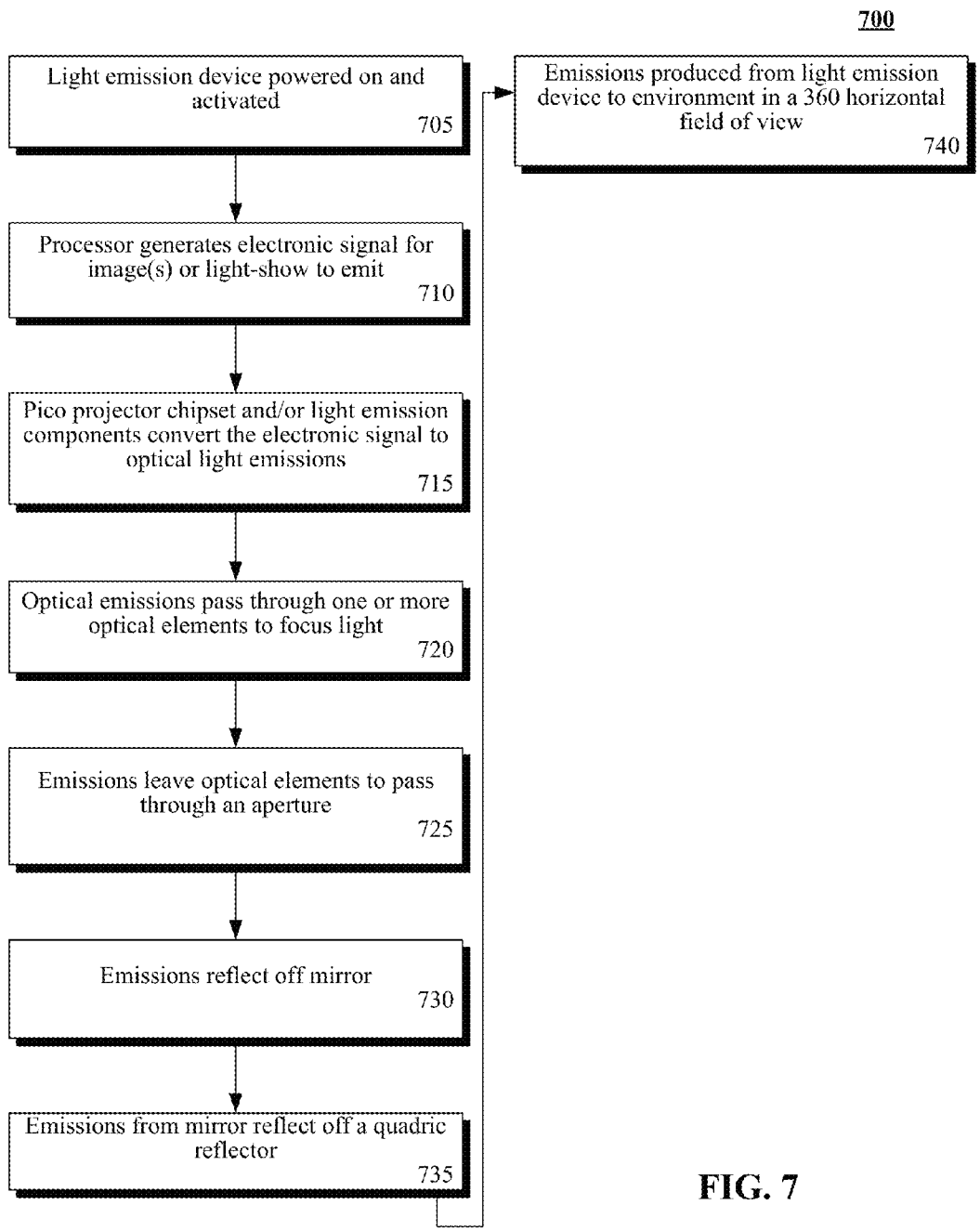
FIG. 7 shows a flow chart for a panoramic light emission device in accordance with embodiments of the disclosure.

FIG. 7 shows a flow chart for a panoramic light emission device in accordance with embodiments of the disclosure. The flow charted process can begin in step 705, where a light emission device is powered on and activated. In step 710, a processor can generate an electronic signal for images to be projected and/or for a light-show. A light show refers to a timed and spatially defined sequence of colors. In step 715, a pico-projector chipset and/or light emissions components can convert the electronic signal into optical light emissions. These emissions may optionally pass through one or more optical elements (e.g., elements 212-228 of FIG. 2) to focus or adjust the emissions in one embodiment. In step 725, the light emissions leave the optical elements to pass through an aperture. The aperture can be an aperture of a quadric reflector. In step 730, the light emissions can reflect of a mirror and onto a quadric reflector as indicted by step 735. In step 740, the emissions off the quadric reflector can emit in a 360 horizontal field of view into an environment.

Accordingly, embodiments of the disclosure herein provide the benefit of eliminating banding when using a one-shot panoramic camera. Specifically, the shape and the light absorbing characteristics of the overhang absorbs light reflected (or refracted) off an curved interior of a transparent outer surface of the one-shot panoramic camera. Without this light being absorbed, a portion of it will be ultimately reflected to the image sensor. The overhang has a substantially conical shape to permit light to enter the one-shot panoramic camera without being blocked by the overhang. The substantially conical shape of the overhang, therefore, corresponds to the vertical field of view for which the one-shot panoramic camera is designed. In one embodiment, the transparent outer surface of the one-shot camera can be curved to direct reflections off its interior to the overhang, where these reflections are absorbed.

Conventional implementations for one-shot cameras have banding issues caused by the reflections that are absorbed by the substantially conical overhang disclosed herein. It is believed that the cause of the banding is not generally known in the art, which was discovered by the innovators as resulting from interior reflections during the course of designing their one-shot panoramic camera that includes the substantially conical overhang for absorbing stray reflections.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

What is claimed is:

1. A device comprising:
   a quadric reflector having a conical shape, which tapers from a wide base to an apex, said apex comprising an aperture;
   a mirror positioned within an overhang enclosure of the device in a plane approximately parallel to a circular cross section of the conical shape, said mirror reflecting environmental light that is reflected by the quadric reflector into the aperture or reflecting light emitting from the aperture onto the quadric reflector;
   the overhang enclosure having a conical shape, which tapers from a wide base at a topmost portion to a narrower center, wherein the mirror is positioned at the narrower center or positioned within a concavity of the narrower center, wherein circular cross sections of the overhang's conical shape from the topmost portion to the narrower center portion have a diminishing circular cross section, wherein a taper of the overhang is inverse to a taper of the quadric reflector, wherein an outer tapering surface of the overhang enclosure between at least the topmost portion and the narrower center portion is formed from or coated with a light absorbing material, wherein the conical shape of the overhang enclosure permits environmental light to reflect off the quadric reflector without operational blockage while the substantially conical shape absorbs secondary reflections to prevent them from entering the aperture;
   a set of one or more optical elements positioned at least partially within a volumetric region of the quadric reflector, said one or more optical elements focusing light passing through the aperture; and
   a transparent outer casing with a circular cross section, wherein a topmost portion of the overhang is secured to a topmost portion of the transparent outer casing, wherein a bottom most portion of the transparent outer casing is secured to a structure that supports the quadric reflector, wherein an interior volume of the transparent outer casing includes the quadric reflector, the mirror, and the overhang enclosure.

2. The device of claim 1, further comprising:
   an image sensor for converting an optical image into an electronic signal, said optical image resulting from light reflecting off the quadric reflector, reflecting off the mirror, passing through the aperture, being focused by the set of one or more optical elements, to be received by the image sensor.

3. The device of claim 2, wherein the set of one or more optical elements comprise:
   a filter for blocking wavelengths that blur the optical image and result in increased color rendering errors if not filtered; and
   a field flattener for correcting field curvature resulting from the quadric reflector to permit the optical image to substantially lie on a flat focal plane.

4. The device of claim 1, further comprising:
   a light emitter for emitting light being focused by the set of one or more optical elements, passing through the aperture, reflecting off the mirror, to reflect off the quadric reflector.

5. The device of claim 1, wherein the transparent outer casing has an interior curve to direct light reflected off an interior of the transparent outer casing to be absorbed by the overhang enclosure.

6. A panoramic camera optical component comprising:
   a mirror positioned within an overhang enclosure in a plane parallel to a circular cross section of a quadric reflector, said mirror reflecting environmental light that is reflected by the quadric reflector into an aperture of the quadric reflector;
   the overhang enclosure having an outer surface that comprises a light absorbing material which absorbs stray light, wherein stray light is light reflected from an interior of a transparent outer casing, wherein the outer surface absorbs light reflecting off an interior of the transparent outer casing; and
   the transparent outer casing with a circular cross section, wherein a topmost portion of the overhang enclosure is secured to a topmost portion of the transparent outer casing, wherein a bottommost portion of the transparent outer casing is securable to a structure that supports the quadric reflector, wherein an interior volume of the transparent outer casing when secured to the structure includes the quadric reflector, the mirror, and the overhang enclosure, wherein a shape of the overhang enclosure permits environmental light to reflect off the quadric reflector without operational blockage while absorbing the significant portion of the stray light to prevent/minimize secondary reflections from entering the aperture.

7. The panoramic camera optical component of claim 6, wherein the transparent outer casing has an interior curve to direct light reflected off an interior of the transparent outer casing to be absorbed by the overhang enclosure.

8. The panoramic camera optical component of claim 7, wherein the transparent outer casing has a uniform thickness, wherein the transparent outer casing has an exterior curve corresponding to the interior curve, said exterior curve resulting in a bottommost cross section of the transparent outer casing being less than a topmost cross section of the transparent outer casing.

9. The panoramic camera optical component of claim 6, wherein the transparent outer casing has a non-uniform thickness to direct light reflecting off an interior of the transparent outer casing to the direct light reflected off an interior of the transparent outer casing to be absorbed by the overhang enclosure.

10. The panoramic camera optical component of claim 6, wherein the overhang has a cylindrical concavity within which the mirror is positioned.

11. The panoramic camera optical component of claim 6, wherein the overhang has a concavity within which the mirror is positioned, wherein the concavity has a circular cross section which increases from a narrowest portion within which the mirror is secured to an widest portion at which the concavity joins the narrowest center of the overhang, wherein a slope or curve of the concavity of the overhang absorbs light reflected off the quadric reflector that is not able to be directed reflected from the quadric reflector off the mirror through the aperture.

12. The panoramic camera optical component, wherein the transparent outer casing screws onto the structure that supports the quadric reflector, wherein the overhang enclosure comprises a plurality of concentric ridges, each having a circular cross section.

13. The panoramic camera optical component, wherein the overhang enclosure has a substantially conical shape, which tapers from a wide base at a topmost portion to a narrower center, wherein the mirror is positioned at the narrower center or positioned within a concavity of the narrower center, wherein circular cross sections of the overhang's conical shape from the topmost portion to the narrower center portion have a diminishing circular cross section, wherein a taper of the overhang is inverse to a taper of the quadric reflector.

14. A device comprising:
  a base comprising of a housing, wherein the housing comprises of:
    a quadric reflector having a conical shape, which tapers from a wide base to an apex, said apex comprising an aperture; and
    a set of one or more optical elements positioned at least partially within a volumetric region of the quadric reflector, said one or more optical elements focusing light passing through the aperture;
  a screwable top secured comprising:
    a mirror positioned within an overhang enclosure of the device in a plane parallel to a circular cross section of a quadric reflector when the screwable top is secured to the base, said mirror reflecting environmental light that is reflected by the quadric reflector into an aperture of the quadric reflector;
    the overhang enclosure having an outer surface that comprises a light absorbing material which absorbs stray light, wherein stray light is light reflected from an interior of a transparent outer casing, wherein the outer surface absorbs a significant portion of light reflecting off an interior of the transparent outer casing; and
    a transparent outer casing with a circular cross section, wherein an interior volume of the transparent outer casing when secured to the base includes the quadric reflector, the mirror, and the overhang enclosure, wherein the conical shape of the overhang enclosure permits environmental light to reflect off the quadric reflector without operational blockage while the conical shape absorbs reflections off an interior of the transparent outer casing to prevent secondary reflections from entering the aperture.

15. The device of claim 14, wherein the transparent outer casing has an interior curve to direct light reflected off an interior of the transparent outer casing to be absorbed by the overhang enclosure.

16. The device of claim 14, wherein the transparent outer casing has a uniform thickness, wherein the transparent outer casing has an exterior curve resulting in a bottommost cross section of the transparent outer casing being less than a topmost cross section of the transparent outer casing.

17. The device of claim 14, wherein the transparent outer casing has a non-uniform thickness to direct light reflecting off an interior of the transparent outer casing to the direct light reflected off an interior of the transparent outer casing to be absorbed by the overhang enclosure.

18. The device of claim 14, wherein the overhang enclosure has a conical shape, which tapers from a wide base at a topmost portion to a narrower center, wherein the mirror is positioned at the narrower center or positioned within a concavity of the narrower center, wherein circular cross sections of the overhang's conical shape from the topmost portion to the narrower center portion have a diminishing circular cross section, wherein a taper of the overhang is inverse to a taper of the quadric reflector.

19. The device of claim 14, wherein the device is a one-shot panoramic camera with a three hundred and sixty degree horizontal field of view.

\* \* \* \* \*